Inventors
Henry Magnuski
Francis R. Steel Jr.
By Mueller & Aichele
Attys.

Inventors
Henry Magnuski
Francis R. Steel Jr.
By Mueller & Aichele
Attys.

Inventors
Henry Magnuski
Francis R. Steel Jr.
By
Mueller & Aichele
Attys.

3,471,646

TIME DIVISION MULTIPLEX SYSTEM WITH PRE-ARRANGED CARRIER FREQUENCY SHIFTS

Henry Magnuski, Glenview, and Francis R. Steel, Jr., Northbrook, Ill., assignors to Motorola, Inc., Franklin Park, Ill., a corporation of Illinois Filed Feb. 8, 1965, Ser. No. 431,036
Int. Cl. H04j 3/02
U.S. Cl. 179—15 13 Claims

ABSTRACT OF THE DISCLOSURE

To prevent intersymbol interference in a multichannel radio communication system the channels are time division multiplexed. A subcarrier generator is responsive to the individual signals to provide a plurality of subcarrier waves of different frequencies. A time division subcarrier multiplex circuit sequentially supplies samples of the subcarrier waves to the transmitter with the sequence and the frequencies of the subcarrier waves being chosen so that the same frequency does not appear in consecutive positions of the sequence.

Communication systems have been used wherein a plurality of signals are multiplexed so that they can be simultaneously transmitted. Multiplexing signals by frequency division, and by time division techniques are known. However, such systems have not been entirely satisfactory in many applications because the equipment required is quite complex, and the received signals may be distorted. In some time division multiplex systems, precise synchronizing is required so that continuous accurate adjustment of the equipment is necessary. Systems having a plurality of repeater links, as required for long range communications, may have the objection that noise and distortion accumulate to render the signals at the end of the system unusable. In some cases the output volume depends on the transmission medium so that the modulation level in every link must be maintained at a satisfactory level, which requires complex adjustments. Also, high transmitter power may be required resulting in objectionably high cost of the system.

The known frequency or time division multiplexing techniques can provide satisfactory communication in systems composed only of line-of-sight links, and which do not include links using forward troposcatter propagation which extend substantially beyond the horizon. Such troposcatter links are often used to provide long spans over water or over inaccessible terrain where installation of the line-of-sight repeaters is not possible or not practical. However, the troposcatter links are characterized not only by very weak received signals, but also by fast variation in signal strength (fast fading) as well as by slower seasonal variations. In addition, on long links of the order of 200 to 400 miles, the signals may be severely distorted due to multipath propagation which causes considerable delay differences between different paths. These differences in delay may be of the order of a few microseconds and if short pulses are transmitted, as in the case of time division multiplexing, they are received as relatively long and distorted pulses. This means that there is considerable interference between pulses transmitted earlier and later, which is called inter-symbol interference. To partially avoid this interference, much longer pulses must be transmitted, resulting in fewer voice channels in a time division multiplexing system. The delay differences also cause frequency selective fading, which means that different frequency sidebands of a modulated carrier spectrum fade at different times. This results in considerable distortion and crosstalk between channels in frequency division multiplexing systems.

In summary, only a few voice channels can be multiplexed by known techniques and transmitted over long troposcatter links and even then communication may not be entirely satisfactory. This imposes a severe baseband or information bandwidth limitation on long troposcatter links.

An object of the present invention is to provide a plurality of channels in a long range communication system which may include one or more troposcatter links, wherein the inter-channel cross talk and the inter-symbol interference is practically eliminated without seriously limiting the number of multiplexed channels.

Another object of the invention is to provide a communication system with a plurality of channels for reliable long range communication, wherein the equipment is relatively simple and inexpensive and does not require critical adjustment.

Still another object of the invention is to provide such a communication system which is not seriously disturbed by noise and distortion, and which is relatively insensitive to transmission errors.

A further object of the invention is to provide reliable communication over a plurality of channels at long range with low transmitter power, and without the requirement for complex synchronization.

A feature of the invention is the provision of a digital multi-channel system wherein voice signals are converted into digital modulation signals, as by a delta modulator, and wherein signalling is accomplished by use of low frequency tones transmitted at high amplitude levels.

Another feature of the invention is the provision of a system utilizing digital modulation signals having relatively long pulses and spaces and including a time division multiplex circuit for sampling these pulses, a frequency division system for converting the pulses to subcarrier waves, and a further time division multiplex circuit for sampling a plurality of subcarrier waves to provide a composite signal. The composite signal includes short pulses of subcarrier waves of different frequencies which occur one at a time, and which are transposed to carrier frequency so that the transmitted wave looks like a wave frequency modulated in discrete frequency steps.

A further feature of the invention is the provision of a receiver for a time division multiplexed signal with subcarrier waves which are transmitted sequentially, including relatively narrow bandpass filters for selecting the various subcarrier waves which may be stretched during transmission so that a plurality of frequencies appear at the same time, with detectors and differential adders connected to each pair of filters to provide a pluse of one polarity in response to one frequency and a pulse of opposite polarity in response to the other frequency, and with the detected pulses being separated by time division demultiplexing circuits and applied to pulse utilization devices, which may include delta demodulators.

Still another feature of the invention is the provision of a digital system for simultaneous transmission of a plurality of voice and/or data channels, which may provide, for example, 24 voice and data channels and one synchronizing channel divided into five groups each including five channels, and with the pulses from each group being time division multiplexed. The pulses from each group actuate a subcarrier wave generator to produce one frequency for a pulse and another frequency for a space, and the subcarrier wave pulse produced by the five multiplex channels are time division multiplexed to form a composite wave, frequency modulated in discrete steps, with only one frequency being applied at a time. This composite wave is transmitted and received and applied to five pairs of filters for selecting the tones from the five multiplex channels of each group, with detector and adder circuits providing pulses of one polarity in response to one frequency of each pair and of opposite polarity in response to the other frequency thereof. The pulse signals so developed are time division demultiplexed, with each demultiplex circuit producing five pulse outputs which are applied to delta demodulators or other pulse utilization circuits. The time division demultiplex circuits in the receiver are synchronized with the time division multiplex circuits in the transmitter by signals received over the synchronization channel of the system.

A still further feature of the invention is the provision of a multi-channel system including subcarrier wave generators which produce short pulses of different frequencies corresponding to pulses or to spaces, with the subcarrier frequencies so selected that once the pulse is transmitted on one frequency, the same frequency is not repeated for several microseconds. In this way, even if the transmitted pulse is considerably stretched by multipath propagation delay differences, it will not coincide and interfere at the receiver with the next pulse transmitted on the same frequency. This eliminates the inter-symbol interference which appears when pulses of the same frequency are transmitted with too short or no time intervals therebetween.

Still another feature of the invention is the provision of a multiplex system having a transmitter which sequentially emits full power, short pulse waves on many different frequencies, with one such short pulse wave being transmitted for each pulse or space of each input channel. The transmitter can be nonlinear (Class C) and fully efficient and no intermodulation products are developed in the transmitter. The pulses are elongated by the multipath propagation, and can be received by relatively narrow bandpass receivers, so that the ratio of received carrier power to noise power is enhanced and a better, error-free transmission is obtained with a given transmitter power.

The invention is illustrated in the drawings wherein.

In practicing the invention a digital communication system is provided for simultaneously transmitting a plurality of signals. Voice signals may be converted to digital signals by delta modulators, or other digital signals may be applied. A plurality of pulse signals are combined in time division multiplex circuits, and the outputs of a plurality of such circuits control the generation of subcarrier waves. The subcarrier waves from a plurality of multiplex circuits are combined in a time division subcarrier multiplex circuit and transmitted. At the receiver a plurality of filters select the individual subcarrier waves and the pair of subcarrier waves corresponding to each time division multiplex channel are detected and applied to a differential adder circuit which produces pulses of one polarity for waves of one frequency and pulses of opposite polarity for waves of the other frequency. The pulse signals are applied through capacity couplers to a time division demultiplex circuit which produces the individual pulse signals. These may be applied to delta demodulators to produce voice signals, or to other pulse utilization circuits.

In the system described, each time division multiplex circuit may have, for example, five inputs, and five such time division multiplex circuits may be used to control five pairs of subcarrier waves which are again time division multiplexed. It is thus possible to transmit 24 voice or data channels and one synchronizing channel. The subcarrier tones may be in the 70 megacycle frequency range, and the composite signal is a wave frequency modulated in steps. A subcarrier wave of one frequency is transmitted to indicate a pulse and a wave of another frequency to indicate a space, so that the information can be obtained from either wave and the advantage of dual diversity reception is obtained. By using delta modulation or other pulse signals with a 38.4 kilocycle rate, the original pulses are 26 microseconds long and the pulses from each channel at the output of the time division multiplexer are about five microseconds long. The pulses of the subcarrier waves at the output of the subcarrier multiplex circuit are about one microsecond long. The composite signal includes the different frequencies one at a time, so that full power and efficiency of the transmitter is always obtained. During transmission the subcarrier pulses may increase in duration because of multipath propagation and will overlap each other at the receiver. The one microsecond pulses may be of the order of 3 or 4 microseconds long in the receiver. This makes it possible to use relatively narrow bandpass filters in the receiver and thereby improve the carrier to noise ratio. By properly selecting their frequencies, subcarrier waves having adjacent frequencies will never appear in succession, so that selection of the waves is facilitated in the receiver.

Figure 1:
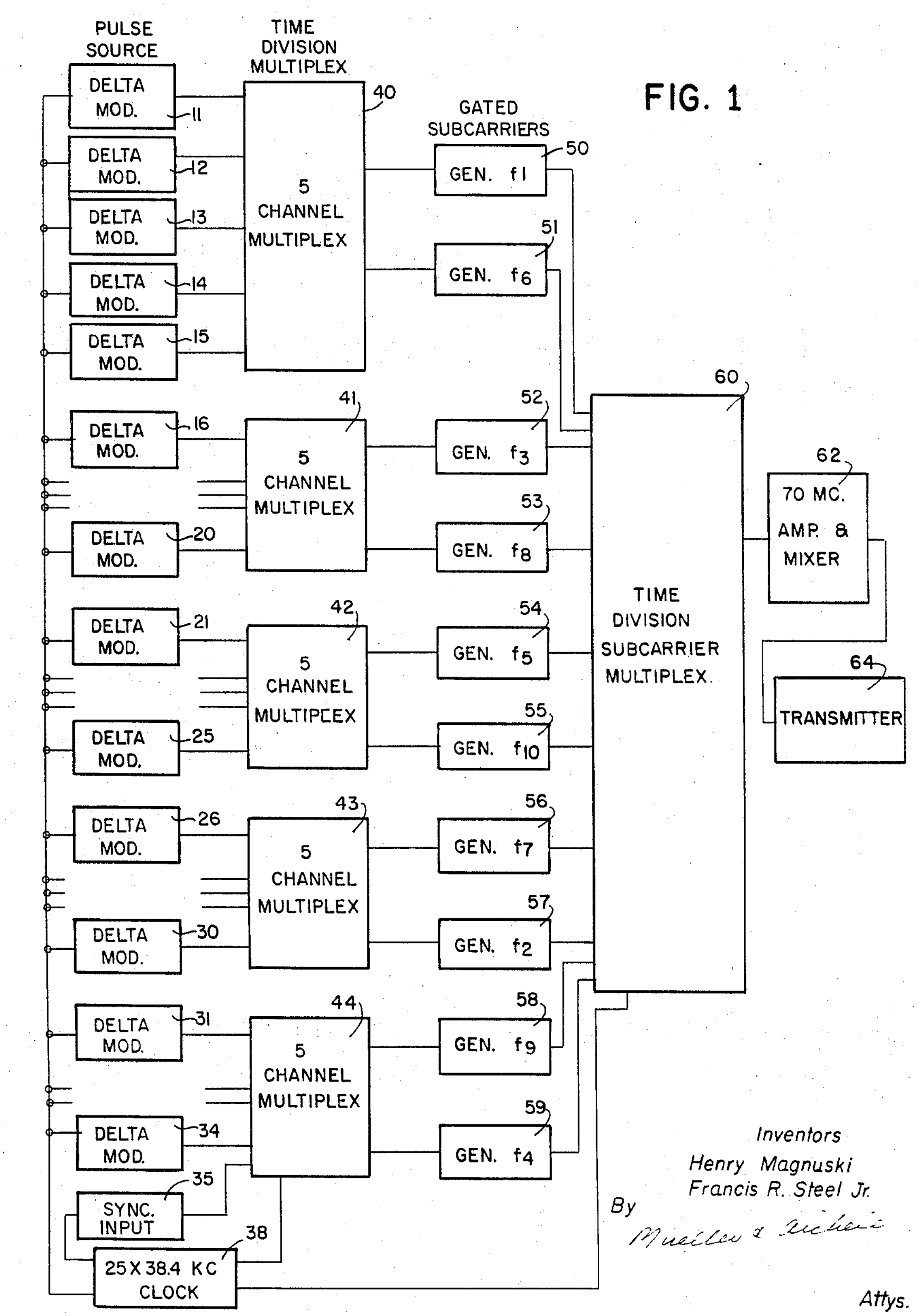
FIG. 1 is a block diagram of the modulating and multiplexing equipment at the transmitter.

Referring now to the drawings, FIG. 1 shows a block diagram of the transmitter. All of the elements shown are known and the novelty is in the combination of the elements as will be described. A plurality of pulse input sources 11 to 16, 20, 21, 25, 26, 30, 31, 34 and 35 are illustrated. It will be apparent that the system illustrated will accept 25 inputs and the ones indicated are representative of others. The pulse inputs may be delta modulators to which voice signals are applied and which produce an output pulse train. The pulse input 35 is a synchronizing input derived from clock 38. The clock 38 provides sampling pulses for the delta modulators, and the pulse rate of the input sources may be 38.4 kilocycles, for example. The clock must produce an output 25 times this frequency, as will be described.

Figure 3:
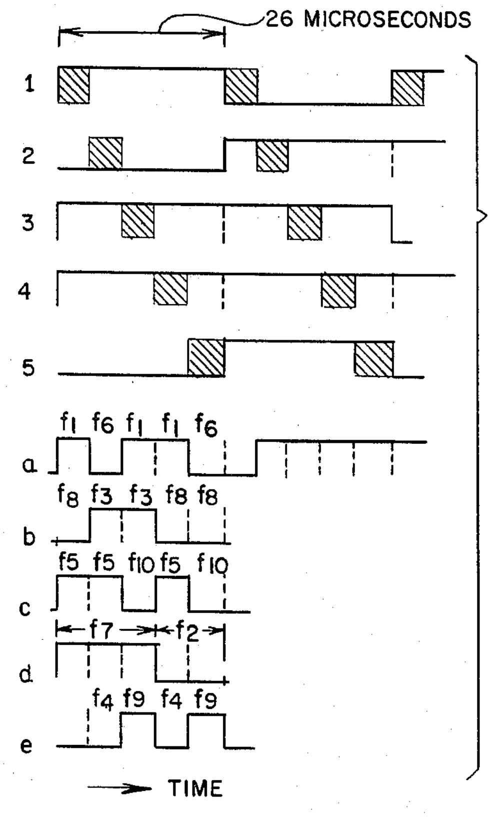
FIG. 3 illustrates the pulse waves of the individual channels at the transmitter and the development of the multiplexed signal.

The signals from the pulse sources are applied to five times division multiplex circuits 40, 41, 42, 43 and 44. The inputs 11 to 15 inclusive are applied to the multiplex circuit 40, and five other inputs may be applied to each of the other multiplex circuits 41, 42, 43 and 44. Referring to FIG. 3, the pulse outputs of the delta modulators or other pulse sources, and the action of time division multiplexing circuits is shown. Lines 1, 2, 3, 4 and 5 show the pulse waves from the sources 11, 12, 13, 14 and 15. At the pulse rate specified, each pulse and each space has a length of approximately 26 microseconds. In the instance in which two pulses immediately follow each other, the result is a long pulse which is shown divided by dotted lines.

The time division multiplex circuit 40 will derive a sample from each of the five pulse sources 11, 12, 13, 14 and 15 in sequence during each pulse period (26 microseconds). Line *a* of FIG. 3 shows the samples derived from the pulse waves represented by lines 1, 2, 3, 4 and 5. As shown by the shaded portions in lines 1, 2, 3, 4 and 5, the samples are taken in a time division sequence with the first sample indicating the pulse from the first source, the second sample indicating the space from the second source, the third and fourth samples indicating the pulses from the third and fourth sources, and the fifth sample indicating the space from the fifth source. The time division multiplex circuit will then sample the next pulse or space from each of the five sources as illustrated in the drawing. In this next series of samples, the first portion is a space and the next four portions are all pulses.

In order to sample each of the five sources during each pulse period, the sampling rate must be five times the 38.4 kilocycle rate of the delta modulator. Synchronizing signals at this rate are applied from clock 38 to the multiplexing circuits 40, 41, 42, 43 and 44. The pulse samples therefore have a duration of 5.2 microseconds. As previously stated, line *a* of FIG. 3 shows the output of multiplex circuit 40. Similarly, lines *b*, *c*, *d* and *e* show representative outputs of the multiplex circuits 41, 42, 43 and 44, respectively.

As shown in FIG. 1, subcarrier generators 50 and 51 are coupled to time division multiplex circuit 40, generators 52 and 53 are coupled to multiplex circuit 41, generators 54 and 55 are coupled to multiplex circuit 42, generators 56 and 57 are coupled to multiplex circuit 43, and generators 58 and 59 are coupled to multiplex circuit 44. Although ten separate subcarrier generators are shown, each pair of generators can be replaced by a single generator which is shifted in frequency, or alternately a single generator which could be shifted to 10 different frequencies or could be frequency modulated by steps could replace all ten generators. The generators shown are gated by the output of the multiplex circuits so that when a pulse is present at the output of circuit 40, one of the subcarrier generators, such as generator 50, provides an output, and when there is a space, the other subcarrier generator 51 provides an output. This is indicated in FIG. 3 wherein line *a* is marked to show that the input pulses produce frequency $f_1$, and the spaces produce frequency $f_6$. As shown in FIG. 1, generator 50 produces the frequency $f_1$, and this is gated on during the pulses. Generator 51 which produces the frequency $f_6$ is gated on during spaces.

The subcarrier generators are designated $f_1$ to $f_{10}$ and may have a frequency of the order of 70 megacycles, with the spacing between the generators being of the order of one megacycle. Actually a spacing of .96 megacycle is advantageous with 1.04 microsecond pulses to prevent objectionable intermodulation between the various tone generators. With the generators centered at 70 megacycles, the range of frequencies extends from 65.68 to 74.32 megacycles.

Figure 4:
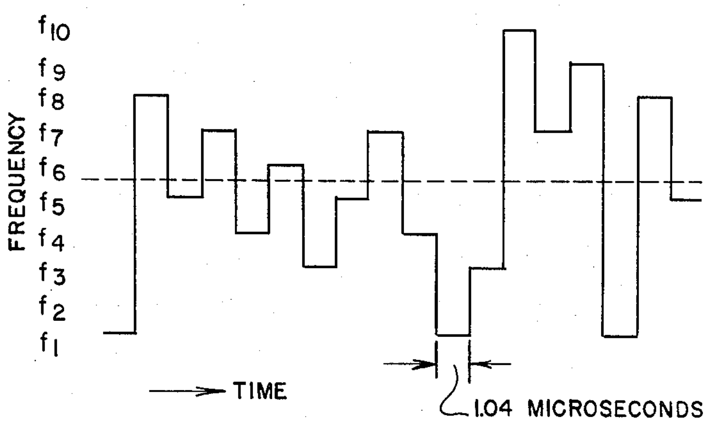
FIG. 4 illustrates the wave produced by the transmitter having discrete frequency step modulation.

The outputs of the generators 50 to 59 are applied to a time division multiplex circuit 60. The multiplex circuit 60 receives clock signals from synchronizing clock 38 at a rate 25 times the 38.4 kilocycles rate of the applied pulses. Accordingly, samples are derived from all the operating generators 50 to 59 during each pulse of subcarrier wave which is 5.2 microseconds long. Each sample derived from the subcarrier multiplex circuit therefore has a duration of 1.04 microseconds. This action is illustrated in FIG. 4 wherein the ten frequencies $f_1$ to $f_{10}$ are shown in order vertically, centered about a mid-frequency of 70 megacycles illustrated by the dotted center line. During the first one fifth portion of the first pulse period, frequency $f_1$ from the first channel (line *a* of FIG. 3) is transmitted. During the second portion, frequency $f_8$ is sented by line *b*. During the following portions are transmitted, frequency $f_5$ from channel *c*, frequency $f_7$ from channel *d*, and frequency $f_4$ from channel *e*. It is to be pointed out that the time scale in FIG. 4 is expanded 5 to 1 with respect to the time scale in FIG. 3. During the second pulse period, samples of each multiplex channel *a* through *e* are again taken, with frequency $f_6$ being provided first and followed by samples of frequencies $f_3$, $f_5$, $f_7$ and $f_4$. During the third pulse period the samples include frequencies $f_1$, $f_3$, $f_{10}$, $f_7$ and $f_9$. This continues for each pulse period which has a duration of 5.2 microseconds to transmit five subcarrier pulses (one from each channel), each having a period of 1.04 microseconds. It will be apparent that the output of the multiplex circuit 60 is a wave centered at 70 megacycles and varying in frequency by steps. This frequency modulated wave is applied to wide band amplifier 62 and then to transmitter 64.

Figure 2:
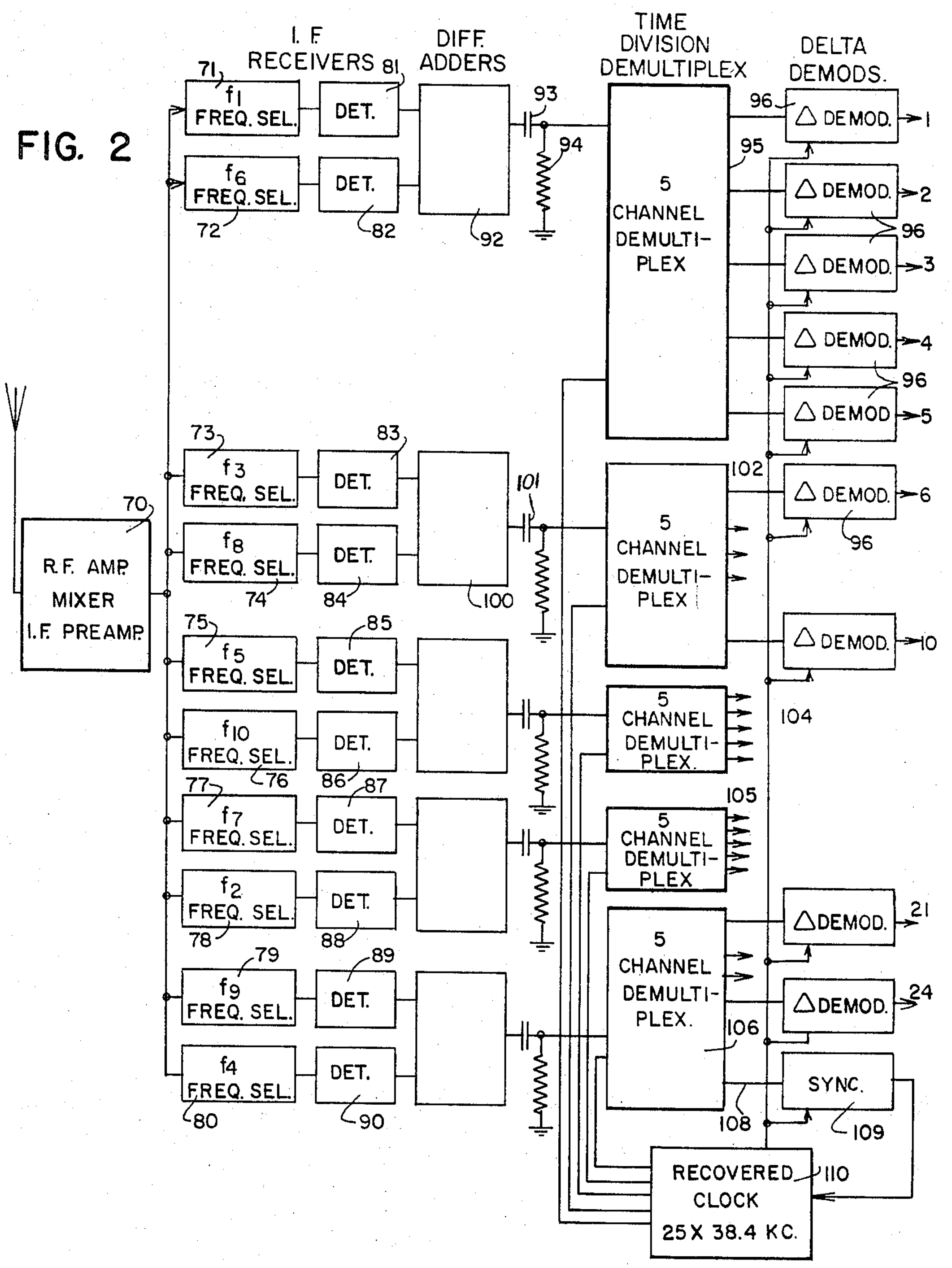
FIG. 2 is a block diagram of the receiver and the demultiplexing and demodulating equipment thereat.

The receiver of the system is shown in FIG. 2, and has a common radio frequency amplifier and mixer portion 70. This may include a common intermediate frequency pre-amplifier. The various subcarrier wave pulses are selected by separately tuned intermediate frequency receiver portions 71 to 80 inclusive. These receiver portions are quipped with bandpass filters to respond to the frequencies produced by the subcarrier generators 50 to 59 at the transmitter.

Although the subcarrier waves included in the composite transmitted signal are applied sequentially (as shown in FIG. 4), during the transmission process these waves will be stretched so that they will overlap. In the system described, each wave as transmitted has a duration of 1.04 microseconds, and in the receiver the waves may have a duration of three to four microseconds. This will tend to fill up the four spaces following each pulse from one multiplex channel during which pulses are transmitted from the other channels. However, the individual waves can be separated because of the difference in frequencies, and the frequencies are selected so that adjacent frequencies cannot occur in succession, to thereby facilitate the selection.

Detectors 81 to 90 inclusive are coupled to the receiver portions 71 to 80 respectively. The receivers and detectors are arranged in pairs to correspond to the subcarrier waves produced in the transmitter. One receiver portion and its detector will produce an output when a pulse is transmitted, and the other portion will produce an output when a space is transmitted. The detectors are polarized so that one detector of each pair produces a positive output voltage and the other produces a negative output voltage, Considering the receiver portions 71 and 72 and the detectors 81 and 82 coupled thereto, receiver 71 will select the subcarrier wave produced by a pulse at the output of the time division multiplex circuit 40 in FIG. 1, and detector 81 will produce a positive pulse from the selected wave. Receiver 72 will produce an output in response to a space at the output of time division multiplex circuit 40, and the detector 82 will provide a negative pulse therefrom. The positive and negative outputs of detectors 81 and 82 are applied to differential adder 92 which provides an output of positive pulses for input pulses transmitted and negative pulses for spaces, in response to the detected signals applied thereto. Either of the detected signals will therefore provide an output of the polarity required to reconstruct the transmitted pulses, so that the differential adder has in effect a redundant or diversity input, and the output therefrom is highly reliable and independent of applied signal strength.

The output of differential adder 92 is applied through capacitor 93 and across resistor 94 to time division demultiplex circuit 95. The capacity coupling improves the diversity reception so that full information will be provided even if one of the subcarriers fades. In the system described, the time constant of the capacity coupling can be about 50 milliseconds, which is longer than the long string of recovered pulses and faster than variation in signal strength due to fading.

The demultiplex circuit 95 will produce five pulse outputs which will correspond to the pulse inputs applied to the multiplex circuit 40 in FIG. 1. In the event that voice signals were applied through a delta modulator at the transmitter, delta demodulators 96 can be coupled to the outputs of the demultiplexing circuit 95 to reproduce the voice signals at the receiver.

Detectors 83 and 84 cooperate in the same way as detectors 81 and 82 to provide signals to differential adder 100, and through capacitor 101 to the time division demultiplex circuit 102. Similarly, the other subcarrier receivers operate through detectors and differential adders to apply signals to demultiplex circuits 104, 105 and 106.

The output 108 of demultiplex circuit 106 provides the synchronizing signal which was applied by the input 35 through time division multiplex circuit 44. This is reconstructed by sync circuit 109 and applied to synchronize clock 110. The clock applies signals to the time division demultiplex circuits 95, 102, 104, 105 and 106 so that the various pulse components are separated from the pulse signals applied thereto. Actually the pulse signals applied to the demultiplex circuits 95, 102, 104, 105 and 106 will correspond to the pulse waves shown on lines *a*, *b*, *c*, *d* and *e* of FIG. 3. The pulse waves applied to the delta modulators 96 coupled to the demultiplex circuit 95 will correspond to the pulse waves applied by inputs 11, 12, 13, 14 and 15 and shown on the lines 1, 2, 3, 4 and 5 in FIG .3.

Clock pulses are also applied from clock 110 to the delta demodulators 96. As previously stated, other types of binary signals may be used in the system, and the clock pulses may be used as required for various pulse utilization devices.

The system described can be provided by use of well known circuits which are available in simple form. The equipment described to provide 24 information channels provides reliable communication and is not critical of adjustment. It is apparent that systems can be provided in accordance with the invention for a different number of channels. The subcarrier waves are applied one at a time at full amplitude, and the two tones used for each multiplex channel provide diversity operation to render the system highly reliable. The signals can be repeated through a plurality of relay links without introducing distortion and accumulating noise.

We claim:

1. A communication system including in combination, a plurality of pulse producing devices arranged as a plurality of groups of devices, each of said pulse producing devices producing pulses of a given time duration, a plurality of time division multiplex means each coupled to all said pulse producing devices of one of said groups, each of said multiplex means sampling each of said pulses produced by said pulse producing devices coupled thereto during said given time duration, subcarrier generator means coupled to said time division multiplex means and actuated thereby to provide a plurality of subcarrier waves of different frequencies in response to pulses from said multiplex means, a time division subcarrier multiplex circuit connected to said subcarrier generator means for sequentially applying samples of all said subcarrier waves from said subcarrier generator means as actuated by said multiplex means during each given time duration whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means for transmitting the multiplexed subcarrier waves produced by said multiplex circuit, receiver means for receiving said multiplexed subcarrier waves, with the individual subcarrier pulses being stretched during the transmission and reception thereof, said sequence further being chosen so that the time interval between pulses of the same frequency in said sequence of subcarrier pulses is greater than said stretching of said subcarrier pulses, said receiver means including a plurality of frequency selective means for selecting the frequencies produced by said subcarrier generators, a plurality of detector means coupled to said frequency selective means for producing output signals from the signals selected thereby, and time division demultiplex means coupled to each detector means for deriving the individual pulse signals therefrom.

2. A communication system including in combination, a plurality of pulse producing devices arranged as a plurality of groups of devices, each of said pulse producing devices selectively producing pulses and spaces of fixed time duration, a plurality of time division multiplex means each coupled to all said pulse producing devices of one of said groups, each of said multiplex means sampling each of said pulses and said spaces produced by said pulse producing devices coupled thereto during said fixed time duration, subcarrier generator means coupled to said time division multiplex means and actuated thereby to provide a plurality of subcarrier waves of different frequencies in response to pulses and spaces from said multiplex means, a time division subcarrier multiplex circuit connected to said subcarrier generator means for sequentially applying samples of all said subcarrier waves provided by said subcarrier generator means during each fixer time duration whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means for transmitting the multiplexed subcarrier waves produced by said multiplex circuit, receiver means for receiving said multiplexed subcarrier waves, with the individual subcarrier pulses being stretched during the transmission and reception thereof, said sequence further being chosen so that the time interval between pulses of the same frequency in said sequence of subcarrier pulses is greater than said stretching of said subcarrier pulses, said receiver means including a plurality of frequency selective means for selecting from the received waves the frequencies produced by said subcarrier generators, said frequency selecting means being arranged in pairs corresponding to the frequencies of the subcarrier waves associated with said multiplexing means, detector means coupled to each pair of frequency selective means for producing output signals from the selected signals, with the output signals from each detector means having portions representing the frequencies selected by the frequency selective means to which such detector means is coupled, and time division demultiplex means coupled to each detector means for deriving the individual pulse signals therefrom.

3. A communication system including in combination, a plurality of pulse producing devices arranged as a plurality of groups of devices, each of said pulse producing devices producing pulses and spaces of fixed time duration, a plurality of time division multiplex means each coupled to all said pulse producing devices of one of said groups, each of said multiplex means sampling each of said pulses and said spaces produced by said pulse producing devices coupled thereto during said fixed timed duration, subcarrier generator means coupled to said time division multiplex means and actuated thereby to provide a plurality of subcarrier waves of different frequencies in response to pulses and spaces from said multiplex means, a time division subcarrier multiplex circuit connected to said subcarrier generator means for producing a multiplexed wave including sequential samples of all said subcarrier waves provided during each fixed time duration whereby a signal consisting of a sqeuence of subcarrier pulses of different frequencies is developed with only one subcarrier frequency being present at a time, said sequence and said frequencies of said subcarrier waves further being chosen so that the same frequency does not appear in consecutive positions of said sequence, transmitter means coupled to said multiplex circuit for transmitting the multiplexed subcarrier wave, receiver means for receiving said multiplexed subcarrier wave, with the individual subcarrier pulses being stretched during the transmission and reception thereof, said sequence further being chosen so that the time interval between pulses of the same frequencey in said sequence of subcarrier pulses is greater than said stretching of said subcarrier pulses, said receiver means including a plurality of frequency selective means for selecting from the received waves the frequencies produced by said subcarrier generators, said frequency selecting means being arranged in pairs corresponding to the frequencies of the subcarrier waves associated with said multiplexing means, detector means coupled to each pair of frequency selective means for producing output signals from the selected signals, each of said detector means providing an output of one polarity in response to one of the frequencies selected by the frequency selective means to which it is coupled and an output of the opposite polarity in response to the other frequency selected thereby, and time division demultiplex means coupled to each detector means for deriving the individual pulse signals therefrom.

4. A communication system including in combination, a plurality of pulse producing devices arranged as a plurality of groups each including a plurality of pulse producing devices, each of said devices producing pulses and spaces of fixed time durations, a plurality of time division multiplex means each coupled to all said pulse producing devices of one of said groups, each of said multiplex means sampling each of said pulses and said spaces produced by said pulse producing devices coupled thereto during said fixed time duration, subcarrier generator means for producing a plurality of waves all of different frequencies, each of said time division multiplex means being coupled to said subcarrier generator means and actuating the same to provied a subcarrier wave of one frequency in response to a pulse and a subcarrier wave of another frequency in response to a space, a time division subcarrier multiplex circuit connected to said subcarrier generator means for sequentially applying samples of all the subcarrier waves produced by said subcarrier generator means during each fixed time duration whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means for transmitting the multiplexed subcarrier waves produced by said multiplex circuit, receiver means for receiving said multiplexed subcarrier waves with the individual subcarrier pulses being stretched during the transmission and reception thereof, said sequence further being chosen so that the time interval between pulses of the same frequency in said sequence of subcarrier pulses is greater than said stretching of said subcarrier pulses, said receiver means including a plurality of frequency selective means for selecting from the received waves the individual subcarrier waves, said frequency selecting means being arranged in pairs corresponding to the frequencies of the subcarrier waves associated with each of said multiplex means, detector means coupled to each frequency selective means for producing an outpult signal from the selected signals, a plurality of differential adders each coupled to said detectors associated with one pair of frequency selective means, each of said differential adders providing first and second outputs in response to the waves selected by the associated pair of frequency selective means, and time division demultiplex means coupled to each differential adder for deriving the individual pulse signals therefrom.

5. A communication system including in combination, a plurality of pulse producing means arranged as a plurality of groups of devices, means applying signals individually to said pulse producing means, each of said pulse producing means producing pulses and spaces of fixed time duration, a plurality of time division multplex means each coupled to said pulse producing means of one of said groups, each of said multiplex means sampling each of said pulses produced by said pulse producing means coupled thereto during said fixed time duration, a plurality of subcarrier generators each producing a wave of a different frequency, each of said time division multiplex means being coupled to a different pair of said subcarrier generators, each time division multiplex means causing a subcarrier wave of one frequency to be produced by one generator coupled thereto in response to a pulse and a subcarrier wave of another frequency to be produced by the other generator coupled thereto in response to a space, a time division subcarrier multiplex circuit connected to said subcarrier generators for providing a multiplexed wave including sequential samples of all the subcarrier waves produced during said fixed time duration whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means coupled to said multiplex circuit for transmitting the multiplexed subcarrier wave, receiver means for receiving said multiplexed subcarrier wave, with the individual subcarrier pulses being stretched during the transmission and reception thereof, said sequence further being chosen so that the time interval between pulses of the same frequency in said sequence of subcarrier pulses is greater than said stretching of said subcarrier pulses, a plurality of frequency selective means for selecting from the received waves the individual subcarrier waves, said frequency selective means being arranged in pairs corresponding to the pairs of generators coupled to said multiplexing means, detector means coupled to each pair of frequency selective means for producing output signals in response to the waves selected by the associated pair of frequency selective means, and time division demultiplexing means coupled to each detector means for deriving the pulse signals therefrom.

6. A communication system including in combination, a plurality of delta modulators each providing pulses and spaces of a given time duration, said modulators being provided as a plurality of groups each including a plurality of delta modulators, means applying voice signals individually to said delta modulators, a plurality of time division multiplex means each coupled to all said delta modulators of one of said groups, subcarrier generator means for producing a plurality of waves all of different frequencies coupled to said time division multiplexing means and being actuated thereby to produce a subcarrier wave of a different frequency in response to each pulse and each space of each multiplex means, a time division subcarrier multiplex circuit connected to said subcarrier generator means for sequentially applying samples of the subcarrier waves produced thereby whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means for transmitting the multiplexed subcarrier waves produced by said multiplex circuit, receiver means for receiving said multiplexed subcarrier waves with the subcarrier pulses of different frequency being stretched during the transmission and reception thereof, said sequence further being chosen so that the time interval between pulses of the same frequency in said sequence of subcarrier pulses is greater than said stretching of said subcarrier pulses, said receiver means including a plurality of frequency selective means arranged in pairs for selecting from the received signals waves at the frequencies produced by actuation of each multiplexing means, detector means coupled to each pair of frequency selective means for producing an output signal of one polarity in response to one of the frequencies selected by each pair of selective means and an output signal of the opposite polarity in response to the other frequency selected thereby, time division demultiplexing means coupled to each detector means for deriving the individual delta modulation signals therefrom, and delta demodulator means coupled to each output of each time division demultiplex means for deriving the transmitted signals therefrom.

7. A communication system including in combination a plurality of delta modulator means each providing pulses and spaces of a given time duration, said modulator means being provided as a plurality of groups each including a plurality of delta modulator means, means applying signals individually to said delta modulator means, a plurality of time division multiplexing means each coupled to said delta modulator means of one of said groups, a plurality of subcarrier generators each producing a wave of a different frequency, a different pair of said subcarrier generators being coupled to each of said time division multiplexing means, each time division multiplexing means causing a subcarrier wave of one frequency to be reproduced in response to a pulse and a subcarrier wave of another frequency to be produced in response to a space, a time division subcarrier multiplex circuit connected to said subcarrier generators for sequentially applying samples of the subcarrier waves produced by said subcarrier generators whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means for transmitting the multiplexed subcarrier waves produced by said multiplex circuit, receiver means for receiving said multiplexed subcarrier waves with the subcarrier pulses of different frequency being stretched during the transmission and reception thereof, said sequence further being chosen so that the time interval between pulses of the same frequency in said sequence of subcarrier pulses is greater than said stretching of said subcarrier pulses, a plurality of frequency selective means arranged in pairs for selecting from the received signals waves at the frequencies produced by said pairs of subcarrier generators, detector means coupled to each pair of frequency selective means for producing an output of one polarity when one of the selected frequencies is present and an output of the opposite polarity when the other selected frequency is present, time division demultiplexing means coupled to each detector means for deriving the individual delta modulation signals therefrom, and delta demodulator means coupled to each time division demultiplexing means for deriving the transmitted signals therefrom.

8. A communication system including in combination, a plurality of delta modulator means each providing pulses and spaces of a given time duration, said modulator means being arranged as a plurality of groups each including a plurality of delta modulator means, means applying signals individually to said delta modulator means, a plurality of time division multiplexing means each coupled to said delta modulator means of one of said groups, a plurality of subcarrier generators each producing a wave of a different frequency, each of said time division multiplexing means being coupled to a different pair of said subcarrier generators and operating the same to produce a subcarriar wave of one frequency in response to a pulse and a subcarrier wave of another frequency in response to a space, a time division subcarrier multiplex circuit connected to said subcarrier generators for sequentially applying samples of the subcarrier waves produced thereby whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means for transmitting the multiplexed subcarrier waves produced by said multiplex circuit, receiver means for receiving said multiplexed subcarrier waves, with the individual subcarrier pulses being stretched during the transmission and reception thereof, said sequence further being chosen so that the time interval between pulses of the same frequency in said sequence of subcarrier pulses is greater than said stretching of said subcarrier pulses, a plurality of frequency selective means arranged in pairs for selecting waves of the frequencies produced by said pairs of subcarrier generators, detector means coupled to each pair of frequency selective means for producing output signals from the received signals, each detector means including a differential adder providing a first output in response to one of the frequencies selected by the associated frequency selective means and a second output in response to the other selected frequency, a plurality of time division demultiplex means for deriving the individual delta modulation signals from the output of the detector means, capacitor coupling means coupling each differential adder to a different demultiplex means, and delta demodulator means coupled to each time division demultiplex means for deriving the transmitted signals therefrom.

9. A communication system including in combination, a plurality of delta modulator devices each providing pulses and spaces of a given time duration, a clock pulse generator device providing pulses having a duration which is an integral part of said given duration, said modulator devices and said pulse generator device being provided as a plurality of groups each including a plurality of devices, a plurality of time division multiplex means each coupled to said devices of one of said groups, subcarrier generator means for producing a plurality of waves all of different frequencies coupled to said time division multiplex means and actuating thereby to produce a subcarrier wave of one frequency in response to a pulse and a subcarrier wave of another frequency in response to a space, with said subcarrier waves produced by actuation of each multiplex means being of different frequencies than the subcarrier waves produced by actuation of the other multiplex means, a time division subcarrier multiplex circuit connected to said subcarrier generators for sequentially applying samples of the subcarrier waves produced by all said subcarrier generators whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, said clock pulse generator device being coupled to said delta modulator devices, said multiplex means and said subcarrier multiplex circuit for synchronizing the same, transmitter means for transmitting the multiplexed subcarrier waves produced by said multiplex circuit, receiver means for receiving said multiplexed subcarrier waves with the subcarrier pulses of different frequency being stretched during the transmission and reception thereof, said sequence further being chosen so that the time interval between pulses of the same frequency in said sequence of subcarrier pulses is greater than said stretching of said subcarrier pulses, said receiver means including a plurality of frequency selective means arranged in pairs for selecting from the received signals waves at the frequencies produced by actuation of each multiplexing means, detector means coupled to each pair of frequency selective means for producing an output signal of one polarity in response to one of the frequencies selected by each pair of selective means and an output signal of the opposite polarity in response to the other frequency selected thereby, a plurality of time division demultiplexing means individually coupled to said detector means and each having a plurality of outputs for providing the individual pulse signals from the multiplex signal, delta demodulator means coupled to a plurality of outputs of each time division demultiplexing means for deriving the transmitted signals therefrom, and synchronizing means coupled to one output for providing pulses synchronized with said pulses produced by said clock pulse generator, said synchronizing means being coupled to said time division demodulating means and to said delta demodulator means for synchronizing the same.

10. A communication system including in combination, a plurality of delta modulator devices each providing pulses and spaces of a given time duration, means applying voice signals individually to said delta modulator devices, a clock pulse generator device providing pulses having a duration which is an integral part of said given time duration, said modulator devices and said clock pulse generator device being provided as a plurality of groups each including a plurality of devices, a plurality of time division multiplex means each coupled to said devices of one of said groups, subcarrier generator means for producing a plurality of waves all of different frequencies coupled to said time division multiplex means and actuated thereby to produce a subcarrier wave of one frequency in response to a pulse and a subcarrier wave of another frequency in response to a space, with said subcarrier waves produced by actuation of each multiplex means being of different frequencies than the subcarrier waves produced by actuation of the other multiplex means, a time division subcarrier multiplex circuit connected to said subcarrier generators for sequentially applying samples of the subcarrier waves produced by all said subcarrier generators whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, said clock pulse generator device being coupled to said delta modulator devices, said multiplex means and said subcarrier multiplex circuit for synchronizing the same, transmitter means for transmitting the multiplexed subcarrier waves produced by said subcarrier multiplex circuit, receiver means for receiving said multiplexed subcarrier waves with the subcarrier pulses of different frequency being stretched during the transmission and reception thereof, said sequence further being chosen so that the time interval between pulses of the same frequency in said sequence of subcarrier pulses is greater than said stretching of said subcarrier pulses, said receiver means including a plurality of frequency selective means arranged in pairs for selecting from the received signals waves at the frequencies produced by actuation of each multiplex means, a pair of detectors coupled to each pair of frequency selective means for producing an output signal of one polarity in response to one of the frequencies selected by each pair of selected means and an output signal of the opposite polarity in response to the other frequency selected thereby, differential adder means coupled to said detectors of each pair for providing a pulse of one polarity in response to a transmitted pulse and of opposite polarity in response to a space, a plurality of time division demultiplex means, capacitor means individually coupling each differential adder means to onetime division demultiplex means, each of said demultiplex means having a plurality of outputs for providing the individual pulse signals from the multiplex signal, delta demodulator means coupled to a plurality of outputs of each time division demultiplex means for deriving the transmitted signals therefrom, and synchronizing means coupled to one output of one of said demultiplex means for providing pulses synchronized with said pulses produced by said clock pulse generator, said synchronizing means being coupled to said time division demultiplex means and to said delta demodulator means for synchronizing the same.

11. A communication system including in combination, a plurality of pulse producing means arranged as a plurality of groups each including a plurality of pulse producing means, means applying signals individually to said pulse producing means, each of said pulse producing means producing pulses and spaces of fixed time duration, a plurality of time division multiplex means each coupled to said pulse producing means of one of said groups, each of said multiplex means sampling each of said pulses produced by said pulse producing means coupled thereto during said fixed time duration, a plurality of subcarrier generators each producing a wave of different frequency, means connecting a different pair of said subcarrier generators to each of said time division multiplex means, each time division multiplex means causing a subcarrier wave of one frequency to be produced by one generator coupled thereto in response to a pulse and a subcarrier wave of another frequency to be produced by the other generator coupled thereto in response to a space, a time division subcarrier multiplex circuit connected to said subcarrier generators for sequentially applying samples of the subcarrier waves produced thereby during said fixed time duration whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, transmitter means for transmitting the multiplexed subcarrier waves produced by said multiplex circuit with the individual subcarrier pulses being stretched during the transmission and reception thereof, said sequence further being chosen so that the time interval between pulses of the same frequency in said sequence of subcarrier pulses is greater than said stretching of said subcarrier pulses, receiver means for receiving said multiplexed subcarrier waves including a plurality of frequency selective means for selecting the individual subcarrier waves, said frequency selective means being arranged in pairs corresponding to the pairs of generators coupled to each multiplex means, detector means coupled to each frequency selective means with one detector means coupled to each pair of selective means providing an output of one polarity and the other detector means coupled thereto providing an output of opposite polarity, a differential adder coupled to said detector means associated with each pair of selective means to provide an output pulse signal, time division demultiplex means, and capacitor means coupling each differential adder to one of said time division multiplex means for applying said output pulse signals thereto.

12. A communication system including in combination, a plurality of pulse producing devices each producing pulses and spaces of fixed time duration, a clock pulse generator device providing pulses having a time duration which is an integral part of said fixed time duration, said pulse producing devices and said generator device being provided as a plurality of groups of devices, a plurality of time division multiplex means each coupled to all said devices of one of said groups, each of said multiplex means sampling each of said pulses and said spaces produced by said group of pulse producing devices coupled thereto during said fixed time duration, subcarrier generator means coupled to said time division multiplex means and actuated thereby to provide a plurality of waves all of different frequencies in response to pulses and spaces from said multiplex means, a time division subcarrier multiplex circuit connected to said subcarrier generator means for sequentially applying samples of the subcarrier waves from said subcarrier generator means as actuated by each of said multiplex means during each fixed time duration whereby a signal consisting of a sequence of subcarrier pulses of different frequencies is developed with only one subcarrier frequency being present at a time, said sequence and said frequencies of said subcarrier waves further being chosen so that the same frequency does not appear in consecutive positions of said sequence, said clock pulse generator device being coupled to said multiplex means and said subcarrier multiplex circuit for synchronizing the same, transmitter means for transmitting the multiplexed subcarrier waves produced by said multiplex circuit, receiver means for receiving said multiplexed subcarrier waves, with the portions of the subcarrier pulses of different frequencies being stretched during the transmission and reception thereof, said sequence further being chosen so that the time interval between pulses of the same frequency in said sequence of subcarrier pulses is greater than said stretching of said subcarrier pulses, said receiver means including a plurality of frequency selective means for selecting from the received waves the frequencies produced by said subcarrier generators, said frequency selecting means being arranged in pairs corresponding to the frequencies of the subcarrier waves associated with said multiplexing means, detector means coupled to each pair of frequency selective means for producing an output signal from the selected signals, each of said detector means providing an output of one polarity in response to one of the frequencies selected by the frequency selective means to which it is coupled and an output of the opposite polarity in response to the other frequency selected thereby, time division demultiplex means coupled to each detector means for deriving the individual pulse signals therefrom, and synchronizing means coupled to one of said demultiplex means for providing pulses synchronized with pulses produced by said clock pulse generator device, said synchronizing means being coupled to said demultiplex means for synchronizing the same.

13. A communication system including in combination, subcarrier generator means adapted to receive a plurality of individual signals and being responsive thereto to provide a plurality of subcarrier waves all of different frequencies, transmitter means, a time division subcarrier multiplex circuit coupled to said subcarrier generator means for sequentially applying samples of all said subcarrier waves from said subcarrier generator means to said transmitter means whereby a signal consisting of a sequence of subcarrier pulses of different frequencies is developed with only one subcarrier frequency being present at a time, said frequencies of said subcarrier waves and said sequence further being chosen so that the same frequency does not appear in consecutive positions of said sequence, said transmitter means acting to transmit the multiplexed subcarrier waves produced by said multiplex circuit, receiver means for receiving said multiplexed subcarrier waves with the individual subcarrier pulses being stretched during the transmission and reception thereof, said sequence further being chosen so that the time interval between pulses of the same frequency in said sequence of subcarrier pulses is greater than said stretching of said subcarrier pulses, said receiver means including means for separating said subcarrier waves according to frequency and means for deriving individual signals therefrom.

References Cited

UNITED STATES PATENTS

| | | | |
|---|---|---|---|
| 3,084,223 | 4/1963 | Marcatili et al. | 179—15 |
| 3,165,583 | 1/1965 | Kretzmer et al. | 178—66 |
| 3,197,563 | 7/1965 | Hamsher et al. | 179—15 |
| 3,226,644 | 12/1965 | Goode et al. | 179—15 |
| 3,261,922 | 7/1966 | Edson et al. | 179—15 |

ROBERT L. GRIFFIN, Primary Examiner

WILLIAM S. FROMMER, Assistant Examiner

U.S. Cl. X.R.

178—50, 66; 343—204